(12) United States Patent
Kato et al.

(10) Patent No.: US 7,555,680 B2
(45) Date of Patent: Jun. 30, 2009

(54) DISTRIBUTED CONTROL APPARATUS

(75) Inventors: Hirofumi Kato, Chita-gun (JP);
Sutemaro Kato, Kariya (JP); Tsutomu Araki, Okazaki (JP)

(73) Assignee: Jtekt Corporation, Osaka-shi (JP)

( * ) Notice: Subject to any disclaimer, the term of this patent is extended or adjusted under 35 U.S.C. 154(b) by 465 days.

(21) Appl. No.: 11/397,739

(22) Filed: Apr. 5, 2006

(65) Prior Publication Data

US 2006/0236189 A1 Oct. 19, 2006

(30) Foreign Application Priority Data

Apr. 5, 2005 (JP) ............................. 2005-108914

(51) Int. Cl.
*G06F 11/00* (2006.01)
(52) U.S. Cl. ............................. 714/43; 714/4; 370/248; 370/251
(58) Field of Classification Search ................... 714/43, 714/4, 716; 370/248, 251
See application file for complete search history.

(56) References Cited

U.S. PATENT DOCUMENTS

| | | | | | |
|---|---|---|---|---|---|
| 5,170,113 | A | * | 12/1992 | Albonesi | 324/66 |
| 5,421,002 | A | * | 5/1995 | Lee et al. | 714/43 |
| 5,513,345 | A | * | 4/1996 | Sato et al. | 714/4 |
| 6,820,210 | B1 | * | 11/2004 | Daruwalla et al. | 714/4 |
| 6,904,542 | B2 | * | 6/2005 | Ryhorchuk et al. | 714/27 |
| 6,993,684 | B2 | * | 1/2006 | Ookawa et al. | 714/43 |
| 7,188,280 | B2 | * | 3/2007 | Shinomiya et al. | 714/43 |
| 7,302,606 | B2 | * | 11/2007 | Fujimoto et al. | 714/9 |
| 7,302,615 | B2 | * | 11/2007 | Sakai | 714/43 |
| 2004/0153861 | A1 | * | 8/2004 | Ohno | 714/43 |
| 2004/0193962 | A1 | * | 9/2004 | Johnson et al. | 714/43 |
| 2004/0230875 | A1 | * | 11/2004 | Kapauan et al. | 714/43 |

FOREIGN PATENT DOCUMENTS

JP 2002-358106 12/2002

* cited by examiner

*Primary Examiner*—Yolanda L Wilson
(74) *Attorney, Agent, or Firm*—Oblon, Spivak, McClelland, Maier & Neustadt, P.C.

(57) ABSTRACT

A distributed control system includes a plurality of PLCs which are connected together via active and backup transmission lines which are opposite in transmission direction. Each of the PLCs includes a diagnosis command sending program for sending a diagnosis command, via a diagnosis-command transmission line, which is one of the active transmission line and the backup transmission line, to a PLC located downstream on the diagnosis-command transmission line; and an acknowledgment returning program, operable upon receipt of the diagnosis command, for returning an acknowledgement response for the diagnosis command, via an acknowledgment-response transmission line, which is the other of the active transmission line and the backup transmission line, to a PLC located downstream on the acknowledgment-response transmission line.

18 Claims, 13 Drawing Sheets

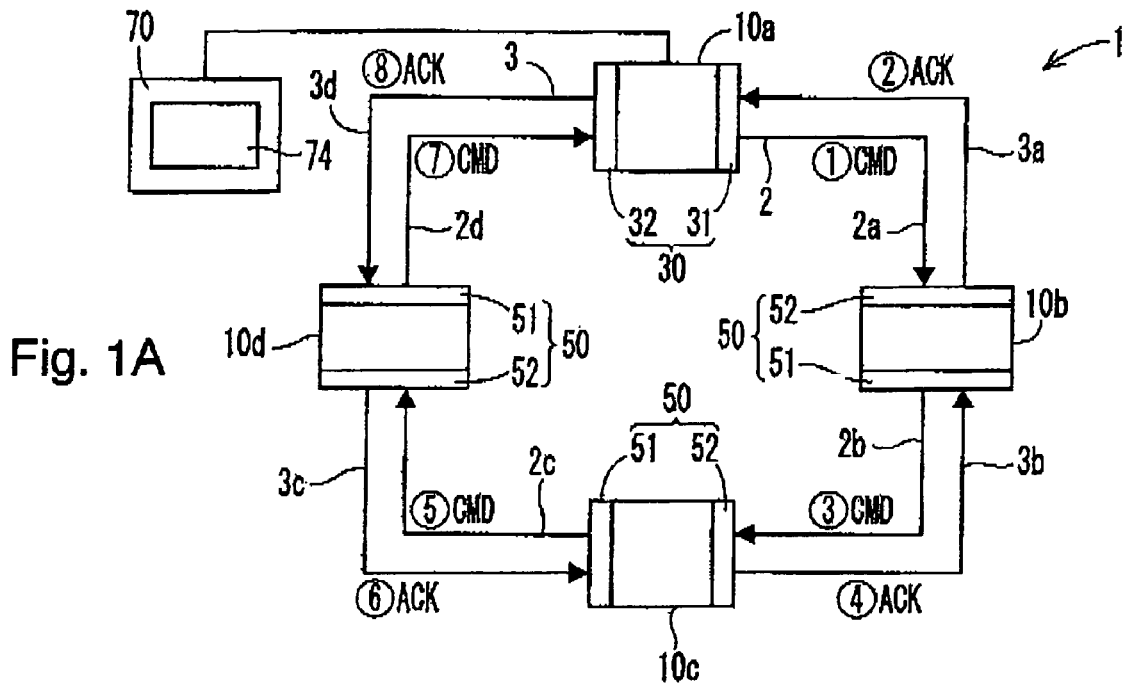
Fig. 1A — Regular-Direction System Diagnosis
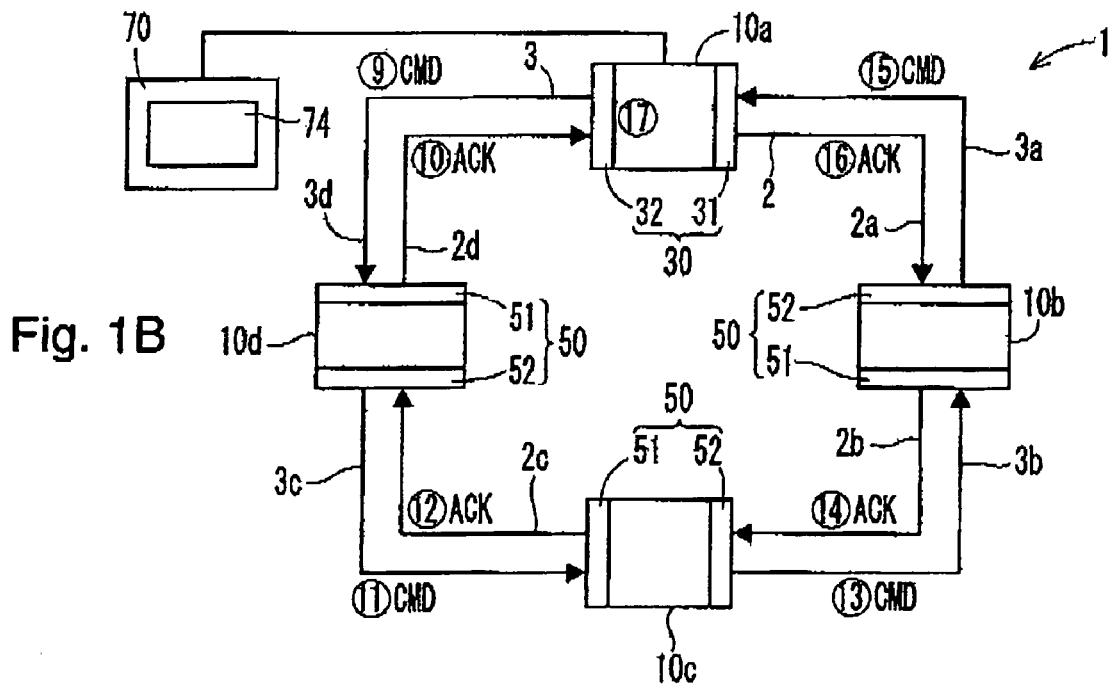
Fig. 1B — Reverse-Direction System Diagnosis

| Condition details | Condition No. | F1 | G1 H1 | H1 | F1 G1 | F2 | G2 H2 | H2 | F2 G2 |
|---|---|---|---|---|---|---|---|---|---|
| | Input Wait Time | | | | | T2 | | | |
| | Input Data | ACK | | CMD | | ACK | | CMD | |
| | Input IF | First IF | | | | Second IF | | | |
| | Presence/Absence of Input | Presence | Absence | Presence | Absence | Presence | Absence | Presence | Absence |
| Wait | | O | | | | | | | |
| Wait | | | O | | | | | | |
| Signal Line Breakage Between SLV and MST or SLV Located Downstream on Active Transmission Line | | | | O | | | | | |
| Signal Line Breakage Between SLV and MST or SLV Located Downstream on Backup Transmission Line | | | O | | O | | | | |
| Reverse Connection to SLV Located Downstream on Active Transmission Line | | | | | | O | | | O |
| Reverse Connection to SLV Located Downstream on Backup Transmission Line | | | | | | | O | O | |

MST: Master, SLV: Slave

Fig. 4

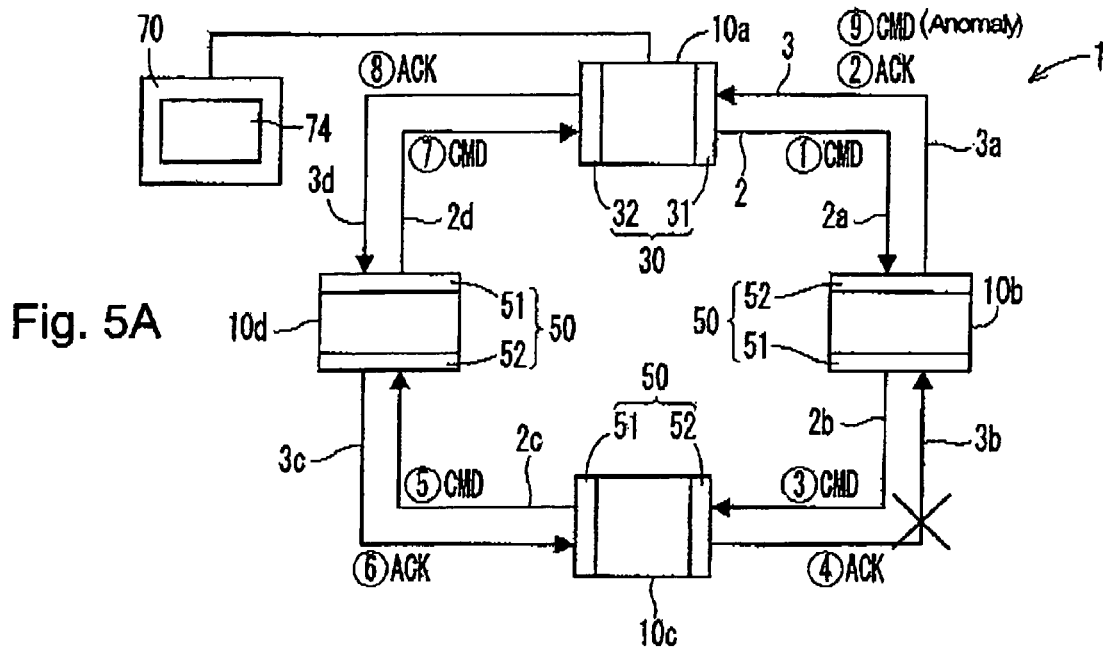
Fig. 5A  Regular-Direction System Diagnosis
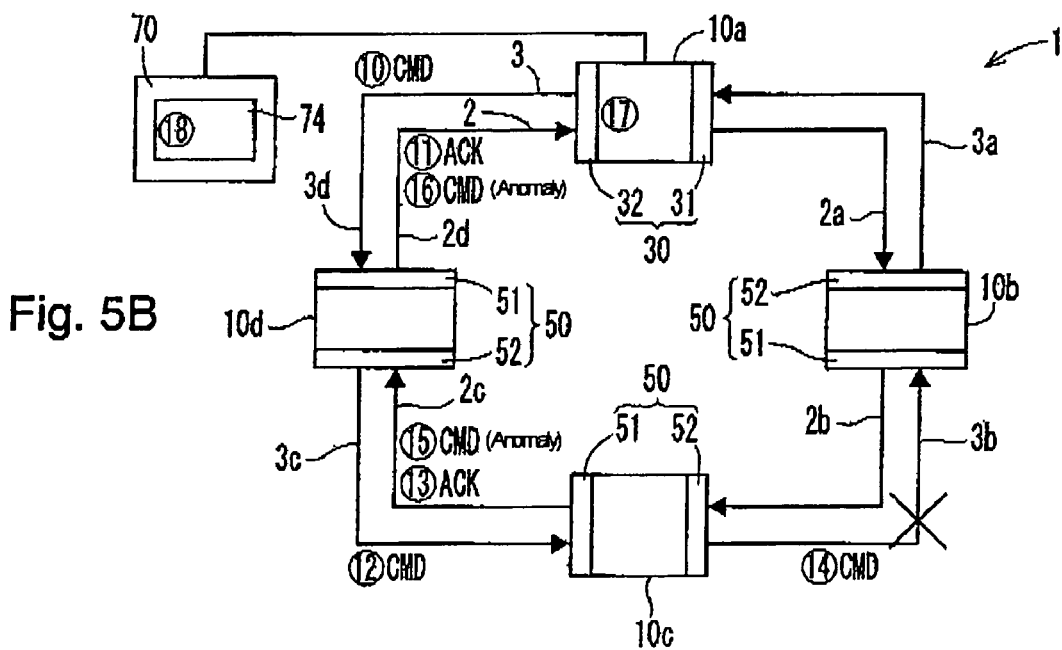
Fig. 5B  Reverse-Direction System Diagnosis Regular-Direction System Diagnosis Reverse-Direction System Diagnosis

| Condition No. | | I1 J10 | J1 | I1 J1 J10 | I4 J6 | J3 | J9 | I5 | I2 J5 | J8 | - | I2 J5 J8 | I3 J7 | J2 | J4 | I6 |
|---|---|---|---|---|---|---|---|---|---|---|---|---|---|---|---|---|
| Input Wait Time | | T2 | | T2 | | T3 | | | T2 | | T2 | | T3 | | | |
| Input Data | | ACK | | CMD | | Anomaly-Information Added CMD | | | ACK | | CMD | | Anomaly-Information Added CMD | | | |
| Input IF | | First IF | | | | | | | Second IF | | | | | | | |
| Presence/Absence of Input | | P | A | P | A | P | A | A | P | A | P | A | P | A | P | A |
| Condition Details | No Anomaly (Normal) | O | | | O | | | | O | | | O | O | | | O |
| | Breakage of Signal Lines 2a, 3a between MST and SLV 10b | | O | O | | O | | | O | | O | | | O | O | |
| | Breakage of Signal Line 2a between MST and SLV 10b | | O | O | O | | | | O | | O | | O | | O | |
| | Breakage of Signal Line 3a between MST and SLV 10b | | O | O | | O | O | O | O | | O | | | O | O | |
| | Breakage of Signal Lines 2d, 3d between MST and SLV 10d | O | | O | O | O | O | | | O | O | | O | O | | |
| | Breakage of Signal Line 2d between MST and SLV 10d | O | | O | | O | O | O | | O | O | | | O | O | |
| | Breakage of Signal Line 3d between MST and SLV 10d | O | | O | O | O | O | | | O | O | | O | | | |

MST: Master, SLV: Slave

| Condition No. | J10/K7 | | K1 | | K1 | | J10/K7 | | J6 | | J3/K4 | | J1 K8/K9 | | J5/K5 | | K2 | | K2 | | J5/K5 | | J7 | | J2/K3 | | J12 K6/K10 | |
|---|---|---|---|---|---|---|---|---|---|---|---|---|---|---|---|---|---|---|---|---|---|---|---|---|---|---|---|---|
| Input Wait Time | T2 | | | | | | | | | | | | T3 | | T2 | | | | | | | | | | | | T3 | |
| Input Data | ACK | | | | | | CMD | | | | | | Anomaly-Information Added CMD | | ACK | | | | | | CMD | | | | | | Anomaly-Information Added CMD | |
| Input IF | First IF | | | | | | | | | | | | | | Second IF | | | | | | | | | | | | | |
| Presence/Absence of Input | P | A | P | A | P | A | P | A | P | A | P | A | P | A | P | A | P | A | P | A | P | A | P | A | P | A | P | A |
| Breakage of Signal Line Forming Active and Back up Transmission Lines Between SLVs | O | | | | | | | | | | | | | | | | | | | | | | | | | | | |
| Breakage of Signal Line Forming Active Transmission Lines Between SLVs | O | | | | | | O | | | | | | O | | O | | | | | | O | | | | | | O | |
| Breakage of Signal Line Forming Back up Transmission Lines Between SLVs | O | | | | | | O | | | | | | | | O | | | | | | O | | | | | | | |
| Reverse Connection to MST | | | | O | O | | | | | | | O | O | | | | | O | O | | | | O | | O | | O | |
| Reverse Connection to SLV 10b | | | | O | O | | | | | | | O | | | | | | O | O | | | O | | | O | | O | |
| Reverse Connection to SLV 10d | O | | | | | | O | | | | | O | O | | O | | | | | | O | | O | | O | | O | |
| Reverse Connection to SLV of Latest Identification | O | | | | | | O | | | | | O | O | | O | | | | | | O | | | | O | | O | |

Condition Details

MST: Master, SLV: Slave

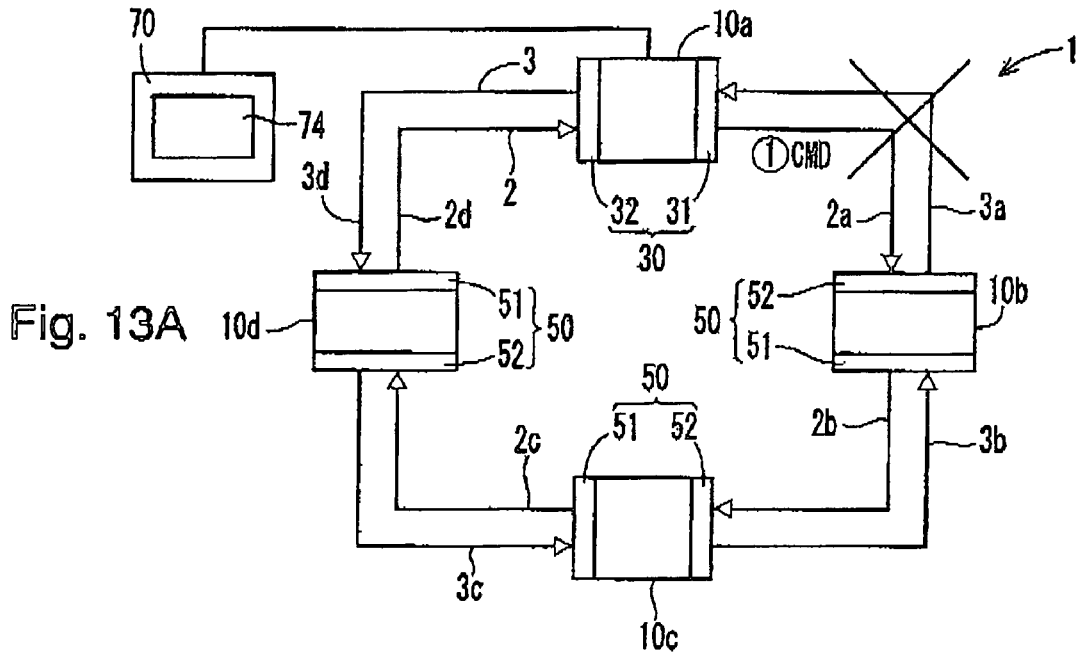
Fig. 13A  Regular-Direction System Diagnosis
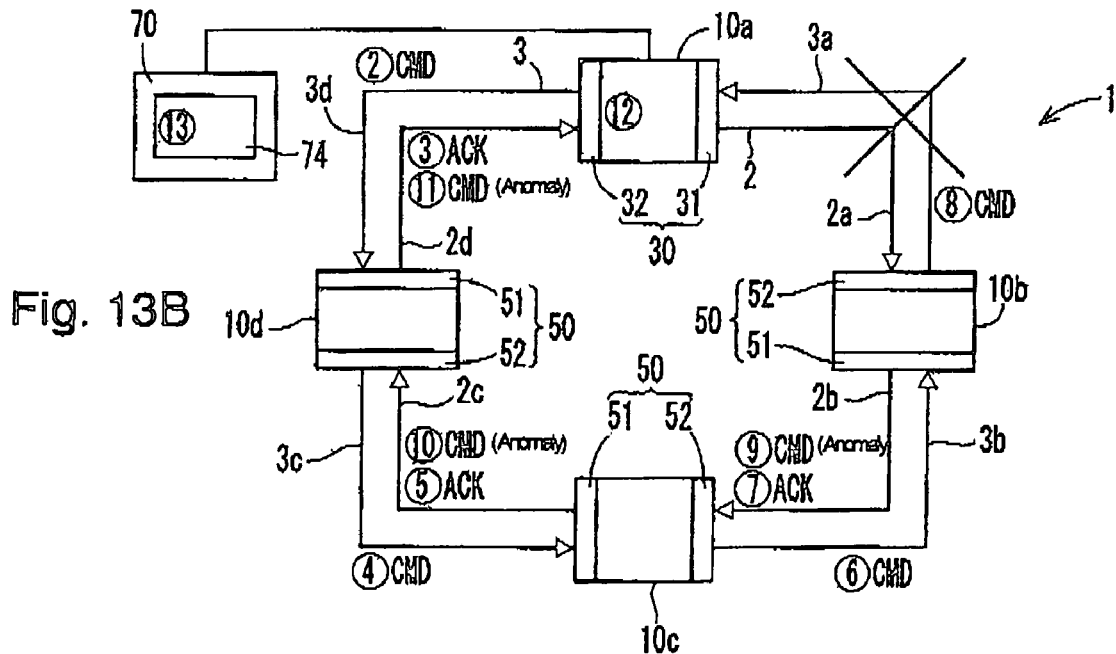
Fig. 13B  Reverse-Direction System Diagnosis

DISTRIBUTED CONTROL APPARATUS

INCORPORATION BY REFERENCE

This invention based on and claims priority under USC 119 with respect to Japanese Patent Application No. 2005-108914, filed on Apr. 5, 2005. Entire contents of that application are incorporated herein by reference.

BACKGROUND OF THE INVENTION

1. Field of the Invention

The present invention relates to a distributed control system including a plurality of PLCs (programmable controller) connected with one another.

2. Description of the Related Art

Conventionally, in order to control machine facilities at a plurality of locations in factory automation, there has been widely used a distributed control system in which a plurality of PLCs for controlling the respective machine facilities are connected with one another via a transmission line (see, for example, Japanese Patent Application Laid-Open (kokai No. 2002-358106).

Such a conventional distributed control system is configured to transmit a diagnosis command to each PLC via the transmission line as a part of initial operation performed after, for example, the power supply is turned on, and to determine whether or not the system is anomalous on the basis of the results of the diagnosis. When the system is determined to be anomalous, the system is stopped temporarily, and an operator takes necessary measures to recovery the system.

However, in the conventional distributed control system, a diagnosis command is merely transmitted through a single transmission line in its transmission direction. Therefore, the conventional system has a drawback in that the location of an anomaly cannot be specified although determination as to whether or not an anomaly has occurred can be performed. Therefore, when the system is determined to be anomalous, the operator must thoroughly check the entire system, and a very long time is required to recover the system.

SUMMARY OF THE INVENTION

In view of the foregoing, an object of the present invention is to provide a distributed control system which can shorten a system recover time after occurrence of an anomaly.

The present invention is directed to a distributed control system in which a plurality of PLCs are connected together via active and backup transmission lines which are opposite in transmission direction.

According to a first aspect of the present invention, each of the PLCs comprises diagnosis command sending means for sending a diagnosis command, via a diagnosis-command transmission line, which is one of the active transmission line and the backup transmission line, to a PLC located downstream on the diagnosis-command transmission line; and acknowledgment-response returning means, operable upon receipt of the diagnosis command, for returning an acknowledgement response for the diagnosis command, via an acknowledgment-response transmission line, which is the other of the active transmission line and the backup transmission line, to a PLC located downstream on the acknowledgment-response transmission line.

Notably, in the present invention, the topology of the active transmission line and the backup transmission line may be of a ring type, a bus type or a star type.

When the topology of the active transmission line and the backup transmission line is of a ring type, each of the PLCs comprises regular direction diagnosis command sending means for sending a diagnosis command to a PLC located downstream on the active transmission line via the active transmission line whose transmission direction is the regular direction; and reverse direction diagnosis command sending means for sending a diagnosis command to a PLC located downstream on the backup transmission line via the backup transmission line whose transmission direction is opposite to the regular direction. The PLCs includes a master PLC which administers the system diagnosis and at least one slave PLC. The regular direction diagnosis command sending means and the reverse direction diagnosis command sending means of the master PLC send the diagnosis command to the slave PLC as a trigger for system diagnosis. Upon receipt of the diagnosis command, the regular direction diagnosis command sending means and the reverse direction diagnosis command sending means of the slave PLC send the diagnosis command to another slave PLC or the master PLC.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIGS. 1A and 1B are schematic diagrams showing an example operation of a distributed control system according to one embodiment of the present invention;

FIG. 4 is a table used for describing the operation of the distributed control system according to the embodiment;

FIGS. 5A and 5B are schematic diagrams showing an example operation of the distributed control system according to the embodiment;

FIGS. 7 and 8 are tables used for describing the operation of the distributed control system according to the embodiment;

FIGS. 13A and 13B are schematic diagrams showing an example operation of the distributed control system according to the embodiment.

DESCRIPTION OF THE PREFERRED EMBODIMENT

An embodiment of the present invention will now be described with reference to the drawings.

Figure 2:
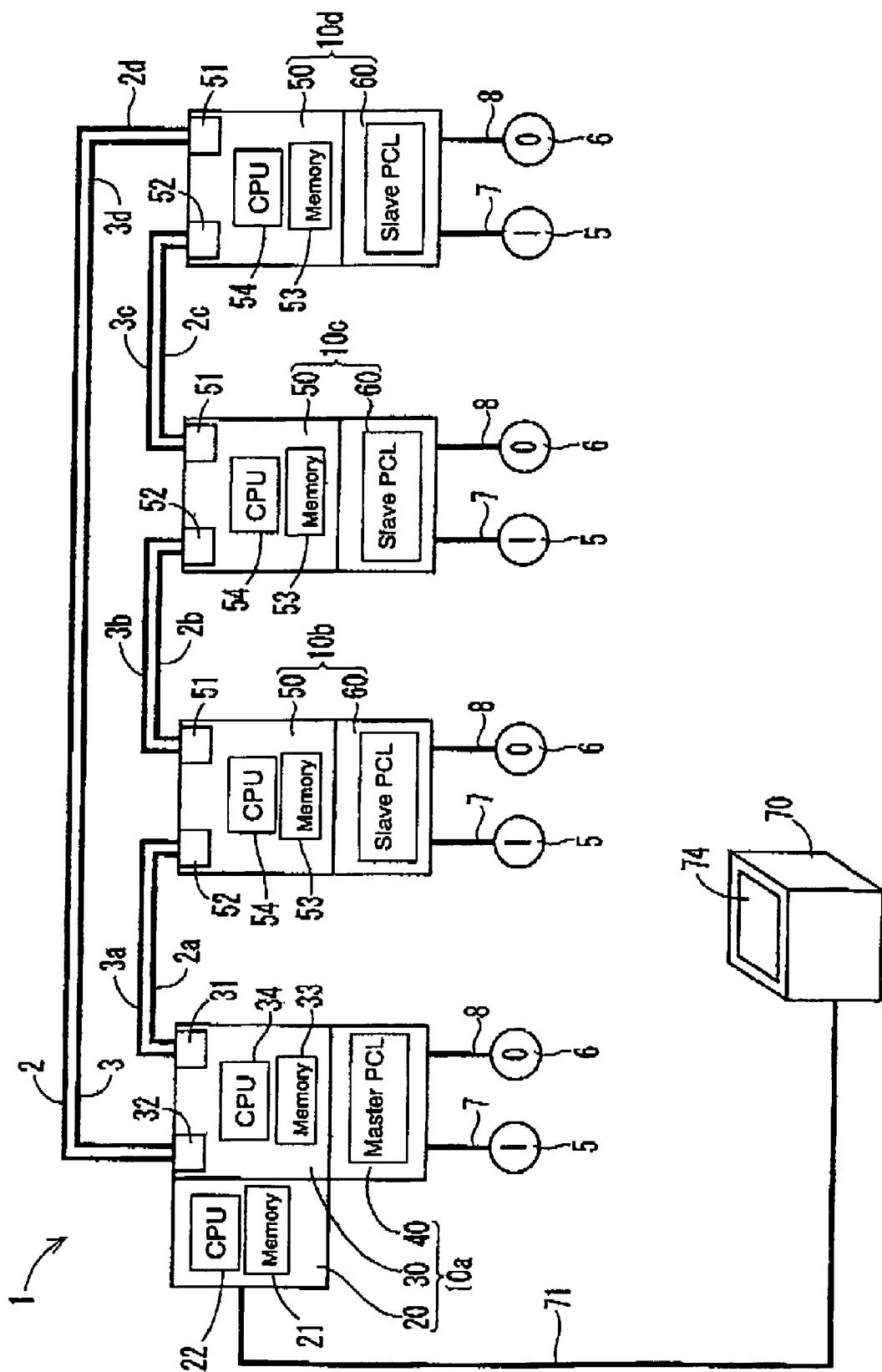
FIG. 2 is a block diagram showing the distributed control system according to the embodiment.

FIG. 2 shows a distributed control system 1 according to the embodiment of the present invention. The distributed control system 1 includes a plurality of PLCs which are connected together via double transmission lines 2 and 3 which are opposite in transmission direction and which has a ring-shaped topology. The maximum number of the PLCs in the distributed control system 1 is limited to 24, for example, However, in the present embodiment, four PLCs 10a to 10d are connected with one another. Different station numbers for identifying these PLCs 10*a* to 10*d* respectively are previously allocated to them as identification information. Through cooperative operation of these PLCs 10*a* to 10*d*, the distributed control system 1 controls a plurality of output devices 6 in a distributed fashion on the basis of input data from a plurality of input devices 5, to thereby secure safety.

Before startup of the distributed control system 1, an operator selects one of the transmission lines 2 and 3 as an active transmission line, and the other as a backup transmission line. Therefore, the following description is on the assumption that the transmission line 2 is selected as an active transmission line, and the transmission line 3 is selected as a backup transmission line.

Each of signal lines 2*a* to 2*d*, which connect the PLCs 10*a* to 10*d* and form the active transmission line 2, is combined with corresponding one of signal lines 3*a* and 3*d*, which connect the PLCs 10*a* to 10*d* and form the backup transmission line 3, to thereby form a single cable. Notably, the signal lines used in the present embodiment are optical fiber lines; however, electrical wires may be used as signal lines.

The PLC 10*a* is a master PLC functioning as a master for administering control of the entire system, and the remaining PLCs 10*b* to 10*d* are slave PLCs each serving as a slave.

The master PLC 10*a* includes a CPU module 20, a communication module 30, and an input-output module 40.

The CPU module 20 is mainly composed of a microcomputer. A sequence program described in a ladder language is stored in a memory unit 21 of the CPU module 20. The CPU module 20 causes the CPU 22 to execute this sequence program, to thereby manage the entire communication of the distributed control system 1 and to receive from the communication module 30 results of a diagnosis of the distributed control system 1 and other information and store them in the memory unit 21.

The communication module 30 is mainly composed of a microcomputer. The communication module 30 has a first IF (interface) 31 to which signal lines 2*a* and 3*a* are connected, and a second IF 32 to which signal lines 2*d* and 3*d* are connected. Therefore, in the communication module 30, when the signal lines 2*a* and 3*a* are connected to the second IF 32 and the signal lines 2*d* and 3*d* are connected to the first IF 31, a reverse-connection anomaly occurs. Hereinafter, such a reverse-connection anomaly will be referred to as an "anomaly of reverse connection to the master PLC 10*a*." A communication program described in a ladder language is stored in a memory unit 33 of the communication module 30. The communication module 30 causes the CPU 34 to perform the communication program to thereby control transmission and reception of data via the IFs 31 and 32 and execute a system diagnosis on the basis of the results of the transmission and reception. Notably, the communication module 30 can receive from the CPU module 20 the identification information of the PLCs 10*a* to 10*d* stored in the memory unit 21, and utilize the information for the system diagnosis.

The input devices 5, such as an emergency switch and safety sensors, and the output devices 6, such as a motor and a robot, are connected to the input-output module 40 via signal lines 7 and 8, respectively, In response to instructions from the communication module 30, the input-output module 40 performs various operations such as feeding information from the input devices 5 to the CPU 34, and turning the powers of the output devices 6 on and off.

Each of the slave PLCs 10*b* to 10*d* includes a communication module 50 and an input-output module 60, but does not include a CPU module. The communication module 50 has the same configuration as the communication module 30 except that signal lines connected to first and second IFs 51 and 52 differ from those connected to the IFs 31 and 32, and a communication program which is stored in a memory unit 53 and is executed by a CPU 54 differs from the communication program which is stored in the memory unit 33 and is executed by the CPU 34. In the communication module 50 of the slave PLC 10*b*, the signal lines 2*b* and 3*b* are connected to the first IF 51, and the signal lines 2*a* and 3*a* are connected to the second IF 52. In the communication module 50 of the slave PLC 10*c*, the signal lines 2*c* and 3*c* are connected to the first IF 51, and the signal lines 2*b* and 3*b* are connected to the second IF 52. In the communication module 50 of the slave PLC 10*d*, the signal lines 2*d* and 3*d* are connected to the first IF 51, and the signal lines 2*c* and 3*c* are connected to the second IF 52. Therefore, in the communication module 50 of each of the slave PLCs 10*b* to 10*d*, when signal lines to be connected to the first IF 51 are connected to the second IF 52 and signal lines to be connected to the second IF 52 are connected to the first IF 51, a reverse-connection anomaly occurs. Hereinafter, such a reverse-connection anomaly will be referred to as an "anomaly of reverse connection to the slave PLC (10*b*, 10*c*, 10*d*)."

The input-output module 60 has a similar configuration as that of the input-output module 40 of the master PLC 10*a*.

In the distributed control system 1 of the present embodiment, a panel computer 70 is connected to the CPU module 20 of the master PLC 10*a* via a signal line 71. The panel computer 70 includes a built-in color monitor 74 for displaying figures, characters, and the like. The panel computer 70 receives the results of a diagnosis of the distributed control system 1 stored in the memory unit 21 of the. CPU module 20, and provides a display on the color monitor 74 in accordance with the received diagnostic results.

Next, there will be described in detail operations A to M, which are performed by the modules 20, 30, 50 and the panel computer 70 when a system diagnosis is performed as a part of initial operation of the distributed control system 1. In the following description, each of diagnosis commands which are transmitted and received by the communication modules 30 and 50 at the time of the system diagnosis will be simply referred to as a "CMD," and each of acknowledgement replies which are transmitted and received by the communication modules 30 and 50 at the time of the system diagnosis will be simply referred to as an "ACK."

A. Initialization by the CPU Module 20

Figure 3:
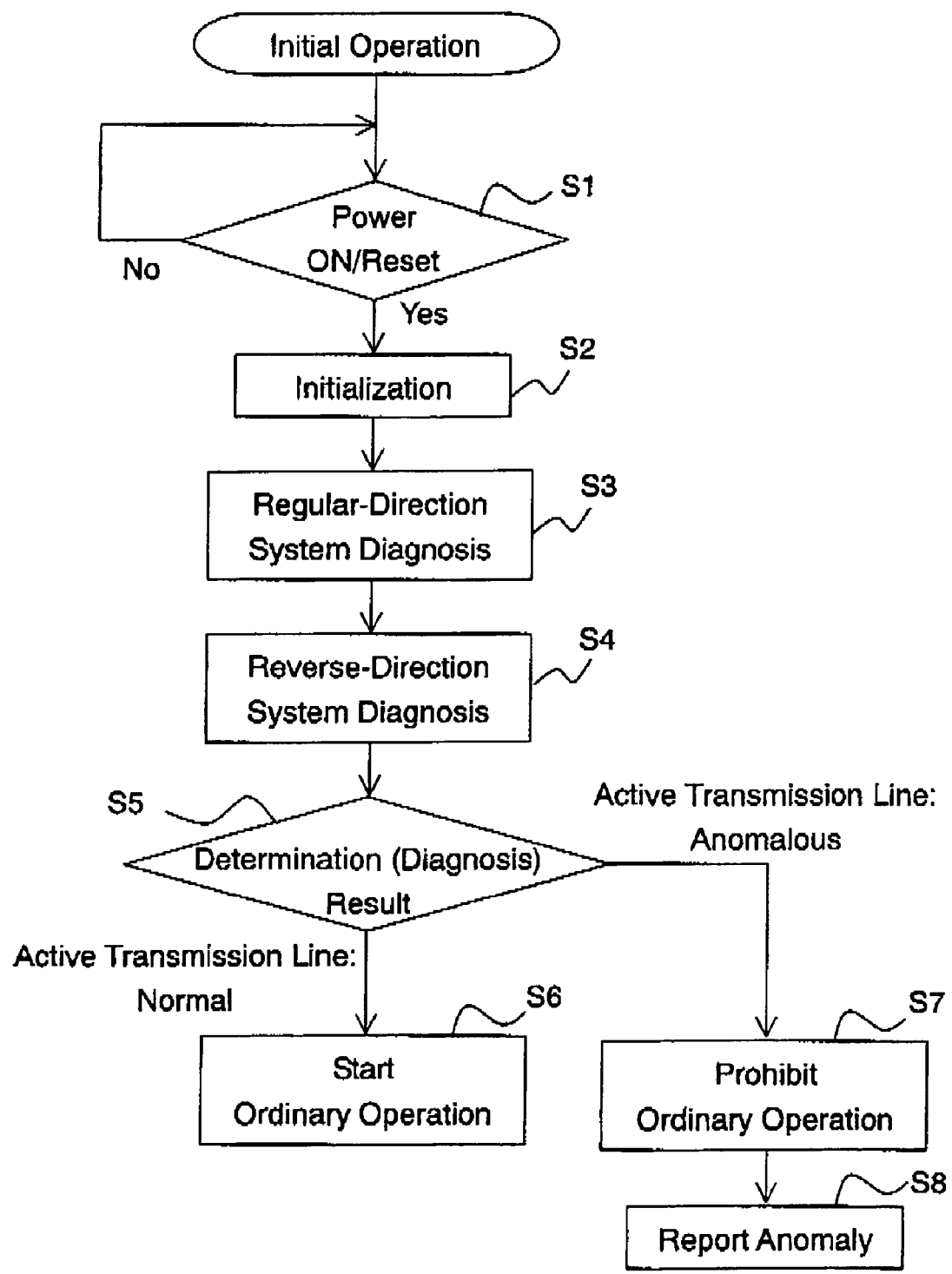
FIG. 3 is a flowchart showing the operation of the distributed control system according to the embodiment.

As shown in FIG. 3, in response to the main power supply of the distributed control system 1 being turned on or reset, the CPU module 20 initializes the communication module 30 (steps S1 and S2). The communication modules 50 of the slave PLCs 10*b* to 10*d* are also initialized.

B. CMD Output by the Communication Module 30

As shown in FIG. 3, after the initialization by the CPU module 20, the communication module 30 starts a system diagnosis in a regular direction, which is the transmission direction of the active transmission line 2 (step S3). Specifically, the communication module 30 outputs from the first IF 31 a CMD with direction information added thereto and representing the regular direction. When the system is normal, the CMD output from the first IF 31 is transmitted via the signal line 2*a* to the slave PLC 10*b* adjacently located on the downstream side on the active transmission line 2, as shown in FIG. 1A, for example.

As shown in FIG. 3, when at least an unillustrated first set time T1 elapses after the output of the CMD with direction information added thereto and representing the regular direction, the communication module 30 starts a system diagnosis in a reverse direction, which is the transmission direction of the backup transmission line 3 (step S4). Specifically, the communication module 30 outputs from the second IF 32 a CMD with direction information added thereto and representing the reverse direction. When the system is normal, the CMD output from the second IF 32 is transmitted via the signal line 3*d* to the slave PLC 10*d* adjacently located on the downstream side on the backup transmission line 3, as shown in FIG. 1B, for example.

C. ACK Output by the Communication Module 30

When the CMD with direction information added thereto and representing the regular direction is input to the first IF 31 or the second IF 32, the communication module 30 outputs an ACK from the second IF 32. When the system is normal, the ACK output from the second IF 32 is transmitted via the signal line 3*d* to the slave PLC 10*d* adjacently located on the downstream side on the backup transmission line 3, as shown in FIG. 1A, for example.

When the CMD with direction information added thereto and representing the reverse direction is input to the first IF 31 or the second IF 32, the communication module 30 outputs an ACK from the first IF 31. When the system is normal, the ACK output from the first IF 31 is transmitted via the signal line 2*a* to the slave PLC 10*b* adjacently located on the downstream side on the active transmission line 2, as shown in FIG. 1B, for example.

Notably, this operation C is not performed when a CMD with anomaly information added thereto is input to the communication module 30 through the operation G or H, which will be described later.

D. ACK Output by the Communication Module 50

When the CMD with direction information added thereto and representing the regular direction is input to the first IF 51 or the second IF 52, the communication module 50 outputs an ACK from the second IF 52. When the system is normal, the ACK output from the second IF 52 is transmitted to the PLC adjacently located on the downstream side on the backup transmission line 3, via a signal line among the signal lines 3*a* to 3*c*, which line is connected to the second IF 52, as shown in FIG. 1A, for example.

When the CMD with direction information added thereto and representing the reverse direction is input to the first IF 51 or the second IF 52, the communication module 50 outputs an ACK from the first IF 51. When the system is normal, the ACK output from the first IF 51 is transmitted to the PLC adjacently located on the downstream side on the active transmission line 2, via a signal line among the signal lines 2*b* to 2*d*, which line is connected to the first IF 51, as shown in FIG. 1B, for example.

Notably, this operation D is not performed when a CMD with anomaly information added thereto is input to the communication module 50.

E. CMD Output by the Communication Module 50

When the CMD with direction information added thereto and representing the regular direction is input to the first IF 51 or the second IF 52, the communication module 50 adds identification information of itself to the input CMD. The communication module 50 outputs from the first IF 51 a CMD to which this identification information has been added. When the system is normal, the CMD output from the first IF 51 is transmitted to the PLC adjacently located on the downstream side on the active transmission line 2, via a signal line among the signal lines 2*b* to 2*d*, which line is connected to the first IF 51, as shown in FIG. 1A, for example.

When the CMD with direction information added thereto and representing the reverse direction is input to the first IF 51 or the second IF 52, the communication module 50 adds identification information of itself to the input CMD. The communication module 50 outputs from the second IF 52 a CMD to which this identification information has been added. When the system is normal, the CMD output from the second IF 52 is transmitted to the PLC adjacently located on the downstream side on the backup transmission line 3, via a signal line among the signal lines 3*a* to 3*c*, which line is connected to the second IF 52, as shown in FIG. 1B, for example.

In the present embodiment, every time when the CMD is output from each of the slave PLCs 10*b* to 10*d*, identification information are cumulatively added to the CMD, and eliminated when the CMD returns to the master PLC 10*a*. When a CMD with anomaly information added thereto is input to the communication module 50, the input CMD is output as is without addition of identification information. Output of the CMD) by the present operation E is performed after the output of the ACK by the above-mentioned operation D as is shown in an example operation to be described later; however, output of the CMD may be performed before output of the ACK.

F. Wait Determination by the Communication Module 50

As shown in FIG. 4, when one of the following conditions F1 and F2 is satisfied, the communication module 60 enters a waiting state for the next data transmission and reception. A second set time T2 in these conditions F1 and F2 is set to a time shorter than the first set time T1. The communication module 50 always enters a waiting state after outputting a CMD with anomaly information added thereto through the operation G or H to be described later, irrespective of whether the condition F1 or F2 is satisfied.

F1: After output of a CMD from the first IF 51, an ACK is input to the first IF 51 within the second set time T2 with no CMD input to the first IF 51, F2: After output of a CMD from the second IF 52, an ACK is input to the second IF 52 within the second set time T2 with no CMD input to the second IF 52.

G. Wire-Breakage Anomaly Determination by the Communication Module 50

As shown in FIG. 4, when the following condition G1 is satisfied, the communication module 50 determines that a wire-breakage anomaly has occurred at the signal line between the corresponding slave PLC and the master PLC or the slave PLC adjacently located on the downstream side on the active transmission line 2, and adds anomaly information representing the wire breakage anomaly and direction information representing the reverse direction to the CMD to which identification information has been added through the above-described operation E. Subsequently, the communication module 50 outputs from the second IF 52 the CMD to which these pieces of information have been added. The CMD output from the second IF 52 is transmitted up to the master PLC 10*a* via the backup transmission line 3, as shown in FIG. 5A, for example.

G1: After output of a CMD from the first IF 51, neither an ACK nor a CMD is input to the first IF 51 within the second set time T2.

As shown in FIG. 4, when the following condition G2 is satisfied, the communication module 50 determines that a wire-breakage anomaly has occurred at the signal line between the corresponding slave PLC and the master PLC or the slave PLC adjacently located on the downstream side on the backup transmission line 3, and adds anomaly information representing the wire breakage anomaly and direction information representing the regular direction to the CMD to which identification information has been added through the above-described operation E. Subsequently, the communication module 50 outputs from the first IF 51 the CMD to which these pieces of information have been added. The CMD output from the first IF 51 is transmitted up to the master PLC 10*a* via the active transmission line 2, as shown in FIG. 5B, for example.

G2: After output of a CMD from the second IF 52, neither an ACK nor a CMD is input to the second IF 52 within the second set time T2.

H. Reverse-Connection-Anomaly Determination by the Communication Module 50

Figure 6A:
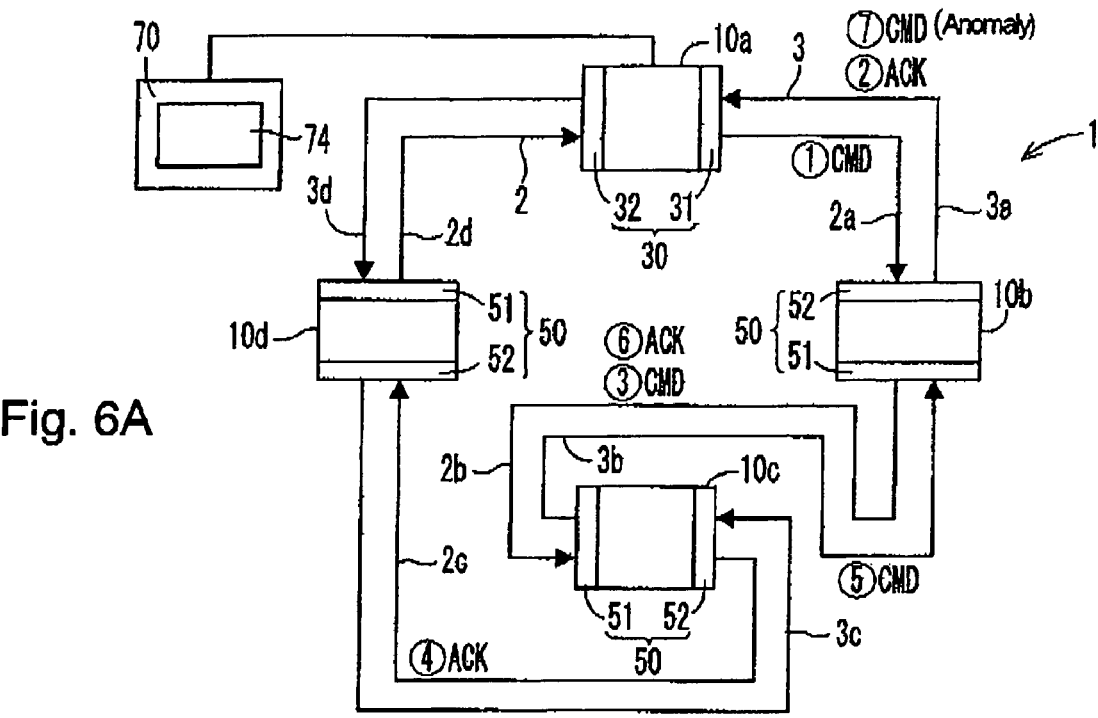
FIGS. 6A and 6B are schematic diagrams showing an example operation of the distributed control system according to the embodiment.

As shown in FIG. 4, when the following condition H1 is satisfied, the communication module 50 determines that an anomaly of reverse connection to the slave PLC adjacently located on the downstream side on the active transmission line 2 has occurred, and adds anomaly information representing the reverse-connection anomaly and direction information representing the reverse direction to the CMD input to the first IF 51. Subsequently, the communication module 50 outputs from the second IF 52 the CMD to which these pieces of information have been added. The CMD output from the second IF 52 is transmitted up to the master PLC 10*a* via the backup transmission line 3, as shown in FIG. 6A, for example.

H1: After output of a CMD from the first IF 51, a CMD is input to the first IF 51 within the second set time T2 with no ACK input to the first IF 51.

Figure 6B:
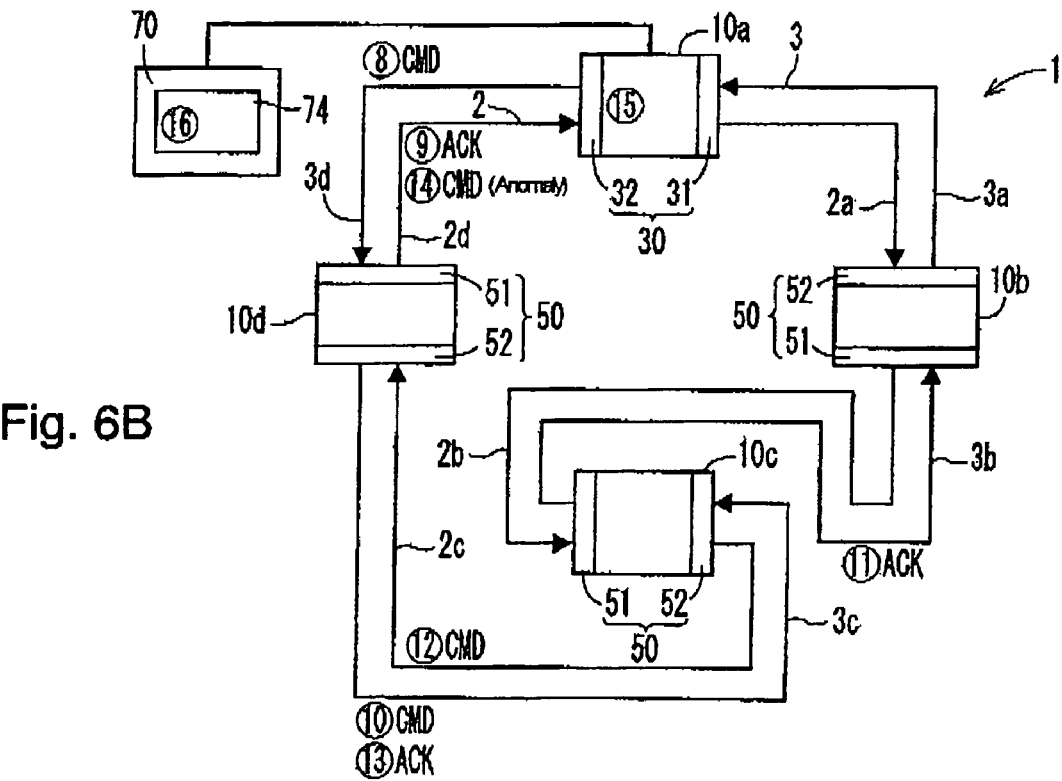

As shown in FIG. 4, when the following condition H2 is satisfied, the communication module 50 determines that an anomaly of reverse connection to the slave PLC adjacently located on the downstream side on the backup transmission line 3 has occurred, and adds anomaly information representing the reverse-connection anomaly and direction information representing the regular direction to the CMD input to the second IF 52. Subsequently, the communication module 50 outputs from the first IF 51 the CMD to which these pieces of information have been added. The CMD output from the first IF 51 is transmitted up to the master PLC 10*a* via the active transmission line 2, as shown in FIG. 6B, for example.

H2: After output of a CMD from the second IF 52, a CMD is input to the second IF 52 within the second set time T2 with no ACK input to the second IF 52.

I. Normal-State Determination by the Communication Module 30

As shown in FIG. 7, when the following conditions I1 to I6 are satisfied, the communication module 30 determines that no system anomaly has occurred. Notably, a third set time T3 in the conditions I3 to I6 is set to a time longer than the second set time T2 and shorter than the first set time T1.

I1: After output of a CMD from the first IF 31, an ACK is input to the first IF 31 within the second set time T2 with no CMD input to the first IF 31.

I2: After output of a CMD from the second IF 32, an ACK is input to the second IF 32 within the second set time T2 with no CMD input to the second IF 32.

I3: After output of a CMD from the first IF 31, a CMD is input to the second IF 32 within the third set time T3. That is, a CMD output from the communication module 30 as a trigger for a regular-direction system diagnosis is transmitted to the communication module 30 via the active transmission line 2.

I4: After output of a CMD from the second IF 32, a CMD is input to the first IF 31 within the third set time T3. That is, a CMD output from the communication module 30 as a trigger for a reverse-direction system diagnosis is transmitted to the communication module 30 via the backup transmission line 3.

I5: After output of a CMD from the first IF 31, a CMD with anomaly information added thereto is not input to the first IF 31 within the third set time T3.

I6: After output of a CMD from the second IF 32, a CMD with anomaly information added thereto is not input to the second IF 32 within the third set time T3.

J. Wire-Breakage-Anomaly Determination by the Communication Module 30

As shown in FIG. 7, the communication module 30 determines that a wire-breakage anomaly has occurred on the signal lines 2*a* and 3*a* when the following conditions J1 to J5 are satisfied, determines that a wire-breakage anomaly has occurred on the signal line 2*a* when the following conditions J1, J2, and J4 to J6 are satisfied, and determines that a wire-breakage anomaly has occurred on the signal line 3*a* when the following conditions J1, J3 to J5, and J7 are satisfied.

J1: After output of a CMD from the first IF 31, neither an ACK nor a CMD is input to the first IF 31 within the second set time T2.

J2: After output of a CMD from the first IF 31, a CMD is not input to the second IF 32 within the third set time T3.

J3: After output of a CMD from the second IF 32, a CMD is not input to the first IF 31 within the third set time T3.

J4: After output of a CMD from the second IF 32, a CMD with anomaly information representing a wire-breakage anomaly and accumulated identification information is input to the second IF 32, wherein the latest identification information piece of the accumulated identification information (hereinafter referred to as the "latest identification information") represents the slave PLC 10*b*.

J5: Identical with the condition I2 of the above-described operation I.

J6: Identical with the condition I4 of the above-described operation I.

J7: Identical with the condition I3 of the above-described operation I.

As shown in FIG. 7, the communication module 30 determines that a wire-breakage anomaly has occurred on the signal lines 2*d* and 3*d* when the above-described conditions J2 and J3 and the following conditions J8 to J10 are satisfied, determines that a wire-breakage anomaly has occurred on the signal line 2*d* when the above-described conditions J2 and J6 and the following conditions J8 to J10 are satisfied, and determines that a wire-breakage anomaly has occurred on the signal line 3*d* when the above-described conditions J3 and J7 and the following conditions J8 to J10 are satisfied.

J8: After output of a CMD from the second IF 32, neither an ACK nor a CMD is input to the second IF 32 within the second set time T2.

J9: After output of a CMD from the first IF 31, a CMD with anomaly information representing a wire-breakage anomaly and identification information representing the slave PLC 10d added as the latest identification information is input to the first IF 31 within the third set time T3.

J10: Identical with the condition I1 of the above-described operation I.

As shown in FIG. 8, the communication module 30 determines that a wire-breakage anomaly has occurred on both the double signal lines between specific two slave PLCs when the above-described conditions J2, J3, J5, and J10 and the following conditions J11 and J12 are satisfied. The communication module 30 determines that a wire-breakage anomaly has occurred on one signal line of the double signal lines between specific two slave PLCs which forms the active transmission line 2 when the above-described conditions J2, J5, J6, and J10 and the following conditions J11 and J12 are satisfied. The communication module 30 determines that a wire-breakage anomaly has occurred on one signal line of the double signal lines between specific two slave PLCs which forms the backup transmission line 3 when the above-described conditions J3, J5, J7, and J10 and the following conditions J11 and J12 are satisfied, Notably, in these determinations, the specific two slave PLCs refer to a slave PLC represented by the latest identification information of the CMD input to the first IF 31 upon satisfaction of the condition J11 and a slave PLC represented by the latest identification information of the CMD input to the second IF 32 upon satisfaction of the condition J12.

J11: After output of a CMD from the first IF 31, a CMD with anomaly information representing a wire-breakage anomaly is input to the first IF 31 within the third set time T3.

J12: After output of a CMD from the second IF 32, a CMD with anomaly information representing a wire-breakage anomaly is input to the second IF 32 within the third set time T3.

K. Reverse-Connection-Anomaly Determination by the Communication Module 30

As shown in FIG. 8, the communication module 30 determines that an anomaly of reverse connection to the master PLC 10a has occurred when the following conditions K1 to K4 are satisfied, determines that an anomaly of reverse connection to the slave PLC 10b has occurred when the above-mentioned conditions K1, K3, and K4 and the following conditions K5 and K6 are satisfied, and determines that an anomaly of reverse connection to the slave PLC 10d has occurred when the above-mentioned conditions K2 to K4 and the following conditions K7 and K8 are satisfied.

K1: After output of a CMD from the first IF 31, a CMD is input to the first IF 31 within the second set time T2 with no ACK input to the first IF 31.

K2: After output of a CMD from the second IF 32, a CMD is input to the second IF 32 within the second set time T2 with no ACK input to the second IF 32.

K3: Identical with the condition J2 of the above-described operation J.

K4: Identical with the condition J3 of the above-described operation J.

K5: Identical with the condition I2 of the above-described operation I.

K6: After output of a CMD from the second IF 32, a CMD with anomaly information representing a reverse-connection anomaly and identification information representing the slave PLC 10b added as the latest identification information is input to the second IF 32 within the third set time T3.

K7: Identical with the condition I1 of the above-described operation I.

K8: After output of a CMD from the first IF 31, a CMD with anomaly information representing a reverse-connection anomaly and identification information representing the slave PLC 10d added as the latest identification information is input to the first IF 31 within the third set time T3.

As shown in FIG. 8, the communication module 30 determines that an anomaly of reverse connection to a specific slave PLC has occurred when the above-mentioned conditions K3 to K5 and K7 and the following conditions K9 and K10 are satisfied. Notably, in this determination, the specific slave PLC refers to a slave PLC represented by the latest identification information of the CMD input to the first IF 31 upon satisfaction of the condition K9 and the latest identification information of the CMD input to the second IF 32 upon satisfaction of the condition K10. In the present embodiment, the specific slave PLC is the slave PLC 10c.

K9: After output of a CMD from the first IF 31, a CMD with anomaly information representing a reverse-connection anomaly is input to the first IF 31 within the third set time T3.

K1 : After output of a CMD from the second IF 32, a CMD with anomaly information representing a reverse-connection anomaly is input to the second IF 32 within the third set time T3.

L. Post-Diagnosis Processing by the Communication Module 30 and the CPU Module 20

As shown in FIG. 3, the communication module 30 completes the system diagnosis through the determinations by the above-described operations I to K, and performs processes corresponding to the determination results. Specifically, in the case where the communication module 30 determines that there is no system anomaly or a wire-breakage anomaly has occurred only on one signal line which forms the backup transmission line 3; i.e., when no anomaly has occurred on the active transmission line 2, the communication module 30 starts the ordinary operation using the active transmission line 2, and transmits the determination result to the CPU module 20 as a diagnostic result (steps S5 and S6). Meanwhile, in the case where the communication module 30 determines that a reverse-connection anomaly has occurred or a wire-breakage anomaly occurred on a signal line forming the active transmission line 2; i.e., when an anomaly has occurred on the active transmission line 2, the communication module 30 prohibits the ordinary operation, and transmits the determination result to the CPU module 20 as a diagnostic result (steps S5 and S7).

Notably, after the regular direction system diagnosis and the reverse direction system diagnosis are each performed one time, the regular direction system diagnosis and the reverse direction system diagnosis may be alternately performed one time or repeatedly prior to the post-diagnosis processing so as to enhance the reliability of the determination (diagnostic) result.

M. Anomaly Report by the Panel Computer 70

Figure 9:
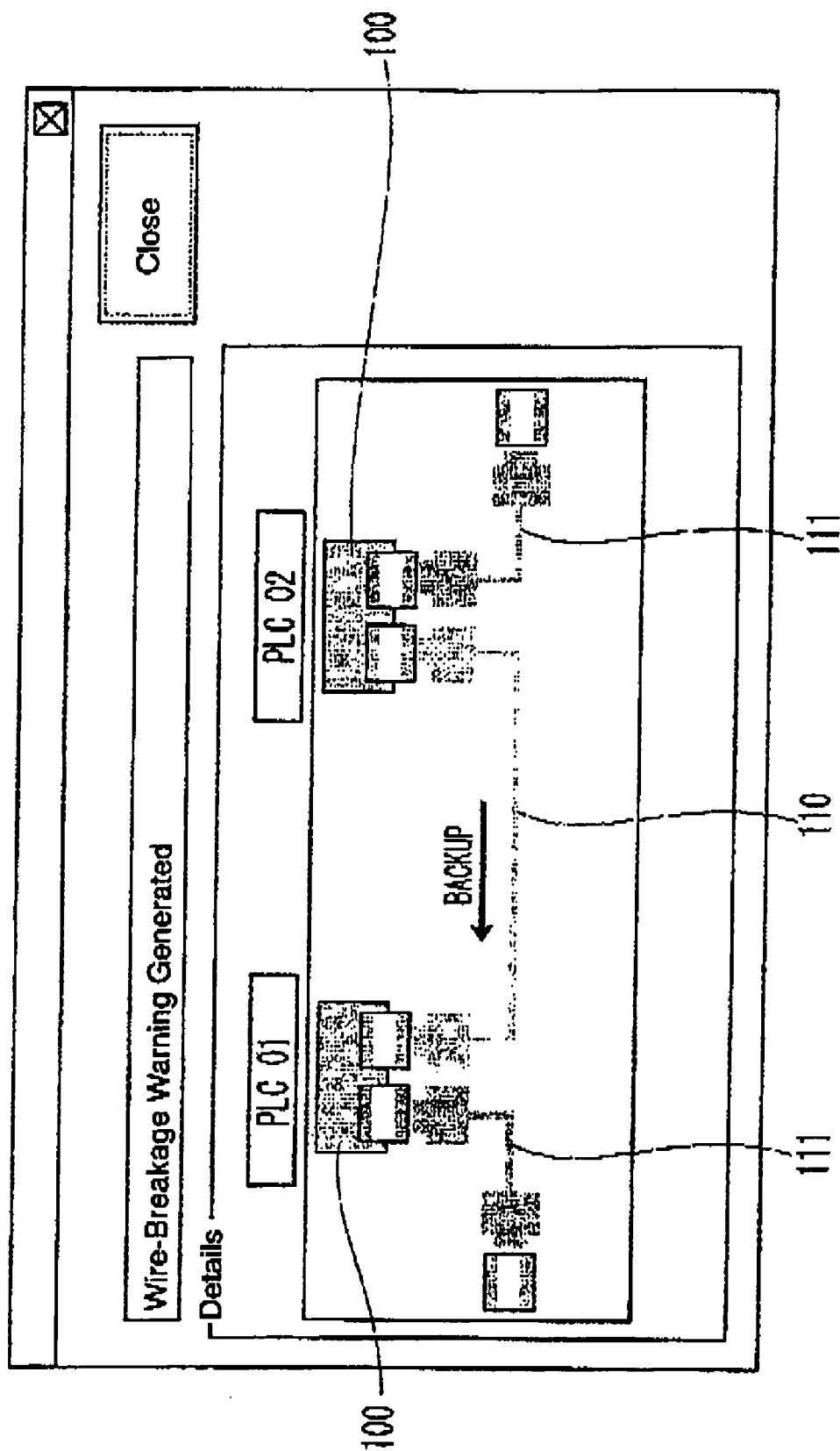
FIGS. 9 to 12 are schematic diagrams showing example display operations of the distributed control system according to the embodiment.
Figure 10:
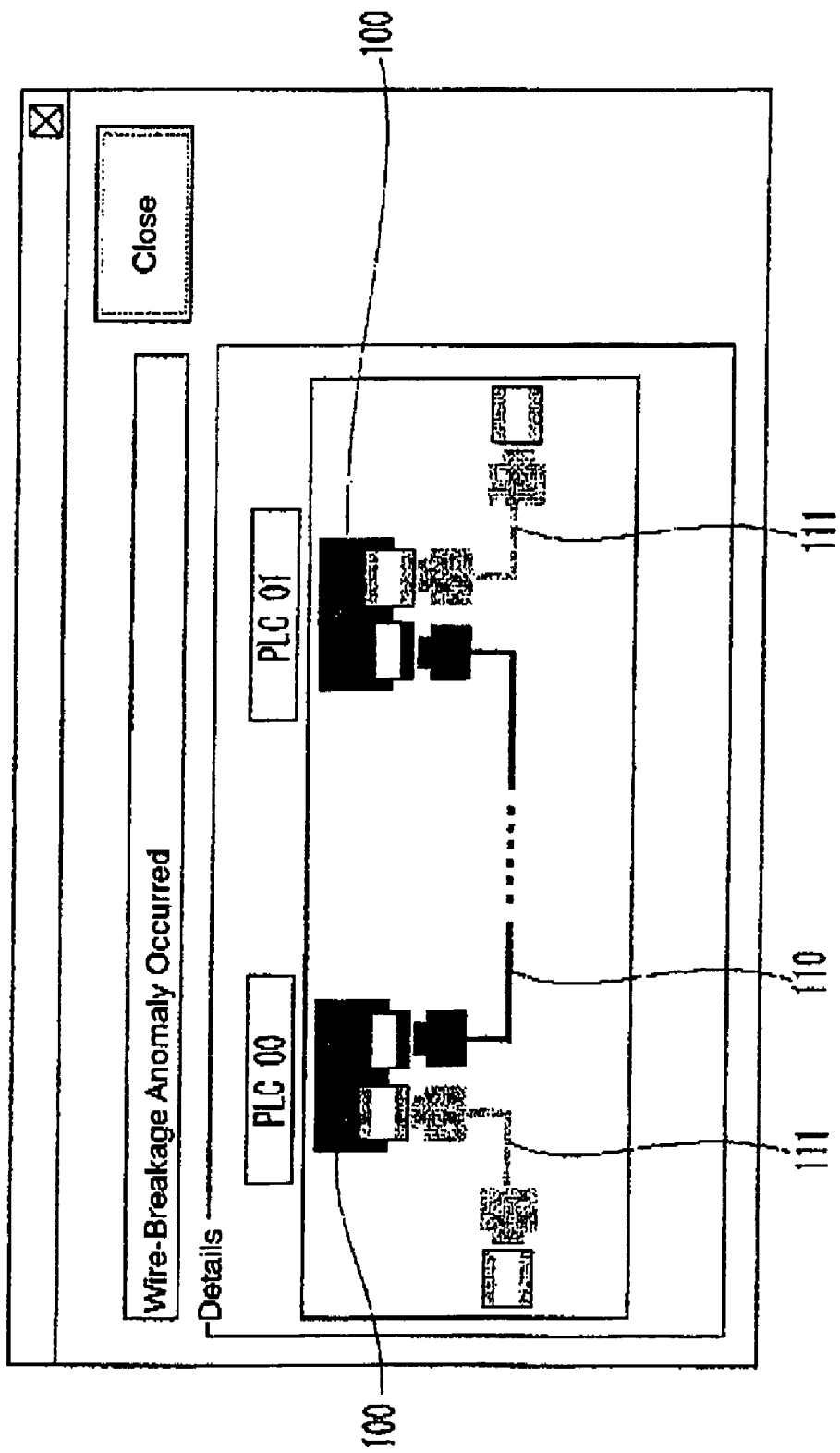
Figure 11:
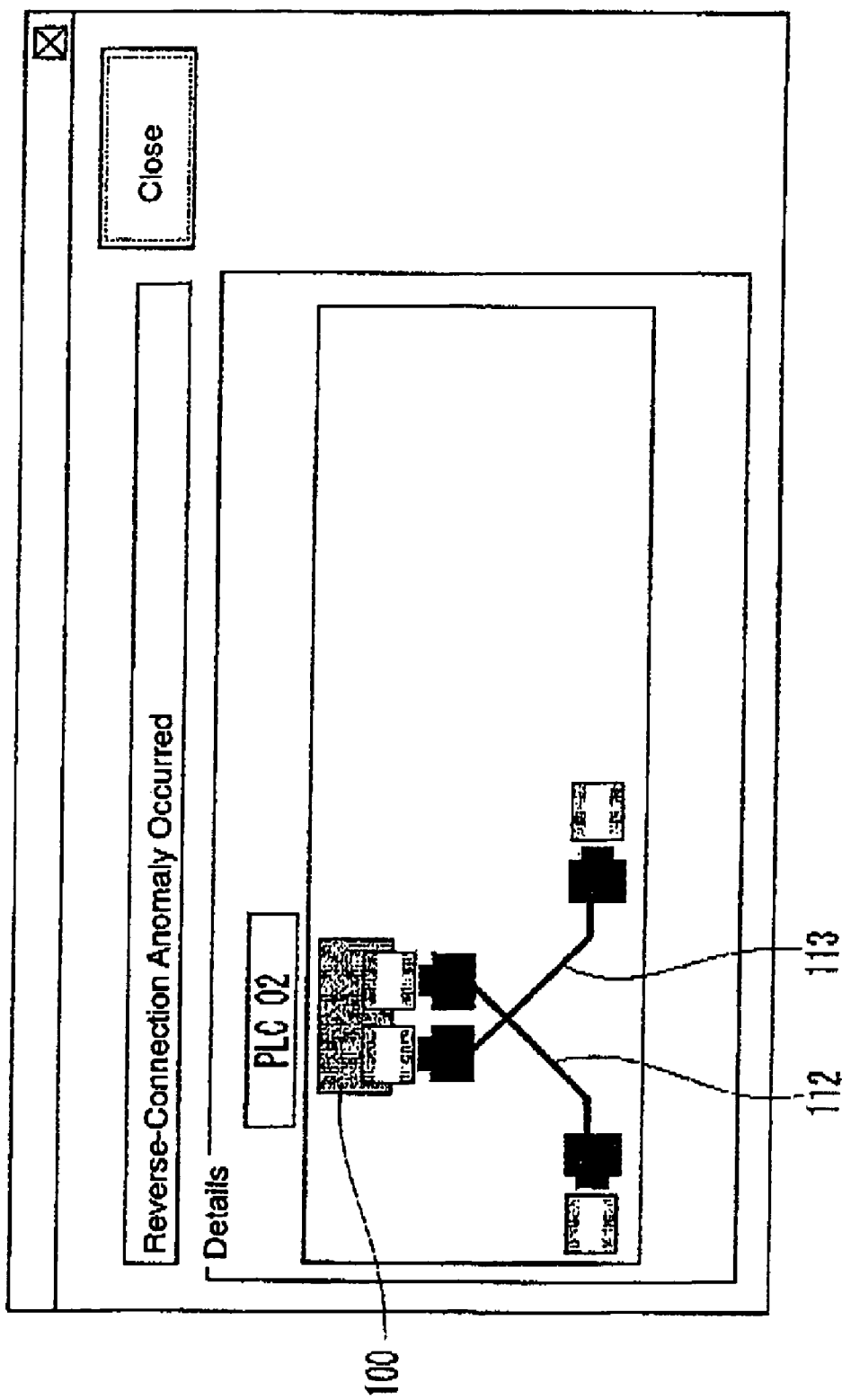

Upon receipt of a diagnostic result indicating occurrence of an anomaly from the CPU module 20, as shown in FIG. 3, the panel computer 70 reports the anomaly to the operator (step S8). The panel computer 70 of the present embodiment reports the anomaly by graphically displaying the type and location of the anomaly on the color monitor 74 as shown in FIGS. 9 to 11. Since changes in display color cannot be shown in FIGS. 9 to 11 and FIG. 12 to be described later, changes in display color are represented by changes in display density.

Moreover, in FIGS. 9 to 12, in the vicinity of each figure 100 representing a PLC, a character string "PLC" is displayed along with a station number, which is identification information of the PLC.

Specifically, when the diagnostic result indicates a wire-breakage anomaly of a single signal line between two PLCs, the panel computer 70 performs monitor display as shown in FIG. 9. That is, the panel computer 70 displays a straight-line-shaped figure 110, which represents a cable including a broken signal line, in a color different from that of a straight-line-shaped figure 111, which represents a normal cable. Simultaneously, the panel computer 70 displays an arrow representing the transmission direction of the transmission line formed by the broken signal line and a character string representing the type of the transmission line (in the example of FIG. 9, a character string "BACKUP" representing the backup transmission line) in the vicinity of the figure 110.

Meanwhile, when the diagnostic result indicates a wire-breakage anomaly of the two signal lines between two PLCs, the panel computer 70 performs monitor display as shown in FIG. 10. That is, the panel computer 70 displays a straight-line-shaped figure 110, which represents a cable including a broken signal line and a portion of which is represented by a broken line, in a color different from that of a straight-line-shaped figure 111, which represents a normal cable.

Figure 12:
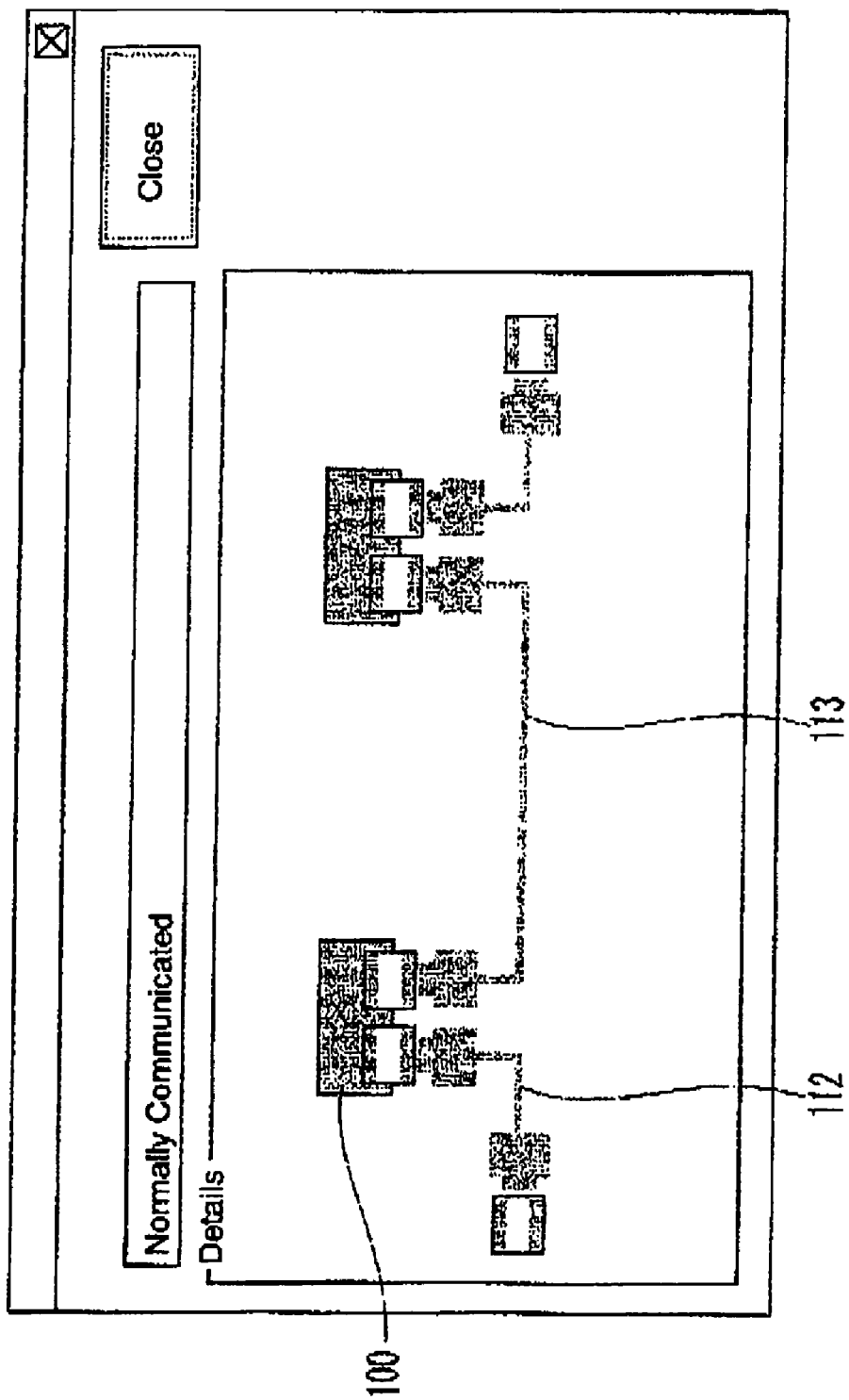

Meanwhile, when the diagnostic result indicates a reverse-connection anomaly, the panel computer 70 performs monitor display as shown in FIG. 11. That is, the panel computer 70 displays the state of connection between straight-line-shaped figures 112 and 113, which represents two cables including reversely connected signal lines, and a figure 100 representing a PLC, in a manner different from the manner for the case of normal connection as shown in FIG. 12. Simultaneously, the panel computer 70 displays the figures 112 and 113 in a color different from the color for the normal state.

Next, example sequence operations regarding the system diagnosis will be described.

α. At the Time When the System is Normal

An example sequence operation at the time when the system is normal will be described with reference to FIGS. 1A and 1B. Notably, numbers each encircled by a circle in FIGS. 1A and 1B correspond to parenthesized numbers which represent respective operation steps in the following description.

(1) When the power of the system is turned on or the system is reset, the maser PLC 10a outputs a CMD from the first IF 31 to thereby start the regular-direction system diagnosis. This output CMD is sent to the slave PLC 10b via the signal line 2a. (2) The slave PLC 10b having received the CMD outputs an ACK from the second IF 52. This output ACK is sent to the master PLC 10a via the signal line 3a. (3) After output of the ACK, the slave PLC 10b outputs from the first IF 51 a CMD with its own identification information added thereto. This output CMD is sent to the slave PLC 10c via the signal line 2b. (4) to (7) Output of an ACK from the second IF 52 as in (2) above and output of a CMD from the first IF 51 as in (3) above are successively performed by the slave PLCs 10c and 10d. (8) The master PLC 10a having received the CMD output from the slave PLC 10d outputs an ACK from the second IF 32. This output ACK is sent to the slave PLC 10d via the signal line 3d.

(9) After elapse of the first set time T1 (after output of an ACK), the master PLC 10a outputs a CMD from the second IF 32 so as to start the reverse-direction system diagnosis. This output CMD is sent to the slave PLC 10d via the signal line 3d. (10) The slave PLC 10d having received the CMD outputs an ACK from the first IF 51. This output ACK is sent to the master PLC 10a via the signal line 2d. (11) After output of an ACK, the slave PLC 10d outputs from the second IF 52 a CMD with its own identification information added thereto. This output CMD is sent to the slave PLC 10c via the signal line 3c. (12) to (15) Output of an ACK from the first IF 51 as in (10) above and output of a CMD from the second IF 52 as in (11) above are successively performed by the slave PLCs 10c and 10b. (16) The master PLC 10a having received the CMD output from the slave PLC 10b outputs an ACK from the first IF 31. This output ACK is sent to the slave PLC 10b via the signal line 2a. (17) The above-described conditions I1 to I6 are satisfied through the above-described operation, the master PLC 10a determines that no system anomaly is present, and starts an ordinary operation.

β. At the Time When One of the Transmission Lines is Broken

An example sequence operation at the time when the signal line 3b is broken will be described with reference to FIGS. 5A and 5B. Notably, numbers each encircled by a circle in FIGS. 5A and 5B correspond to parenthesized numbers which represent respective operation steps in the following description.

(1) to (3) Operations identical with those in steps (1) to (3) in the above-described example operation α. (4) The slave PLC 10c having received a CMD outputs an ACK from the second IF 52. This output ACK is not sent to the slave PLC 10b because of breakage of the signal line 3b. (5) to (8) Operations identical with those in steps (5) to (8) in the above-described example operation α. Accordingly, the CMD returns to the master PLC 10a, and thus, the master PLC 10a can grasp at this point in time that no anomaly occurs on the active transmission line 2. (9) The slave PLC 10b, which failed to receive the output ACK from the slave PLC 10c within the second set time T2, determines that a wire-breakage anomaly has occurred, generates a CMD with anomaly information added thereto and representing the wire-breakage anomaly, and outputs it from the second IF 52. This output CMD is sent to the master PLC 10a via the signal line 3a. At this point in time, the master PLC 10a can grasp that a wire-breakage anomaly has occurred on the backup transmission line 3.

(10) After elapse of the first set time T1 (after receipt of the CMD with anomaly information added thereto), the master PLC 10a outputs a CMD from the second IF 32 so as to start the reverse-direction system diagnosis. This output CMD is sent to the slave PLC 10d via the signal line 3d. (11) to (13) Operations identical with those in the steps (10) to (12) of the above-described example operation α. (14) After output of an ACK, the slave PLC 10c outputs from the second IF 52 a CMD with its own identification information added thereto. This output CMD is not sent to the slave PLC 10b because of breakage of the signal line 3b. Therefore, no ACK is output from the first IF 51 of the slave 10b. (15) The slave PLC 10c, which failed to receive the output ACK from the slave PLC 10b within the second set time T2, generates a CMD with anomaly information added thereto and representing the wire-breakage anomaly, and outputs it from the first IF 51. This output CMD is sent to the slave PLC 10d via the signal line 2c. (16) The slave PLC 10d, which has received the CMD with anomaly information added thereto, outputs the received CMD as is from the first IF 51. This output CMD is sent to the master PLC 10a via the signal line 2d. (17) Since the above-described conditions J3, J5, J7, J10 to J12 are, satisfied through the above-described operation, the master PLC 10a determines that a wire-breakage anomaly has occurred on the signal line 3b, and prohibits the ordinary operation by, for example, prohibiting execution of a portion of the sequence program. (18) The panel computer 70 reports the location of the wire-breakage anomaly by means of monitor display as shown in FIG. 9.

γ. At the Time When Both the Transmission Lines are Broken

An example sequence operation at the time when both the signal lines 2a and 3a are broken will be described with reference to FIGS. 13A and 13B. Notably, numbers each encircled by a circle in FIGS. 13A and 13B correspond to parenthesized numbers which represent respective operation steps in the following description.

(1) When the power of the system is turned on or the system is reset, the maser PLC 10a outputs a CMD from the first IF 31 to thereby start the regular-direction system diagnosis. This output CMD is not sent to the slave PLC 10b because of breakage of the signal line 2a, and therefore no ACK is output from the second IF 52 of the slave PLC 10b. Accordingly, the master PLC 10a, which failed to receive an ACK within the second set time T2, can grasp at this point in time that a wire-breakage anomaly has occurred between the PLCs 10 and 10b.

(2) The slave PLC 10c, which failed to receive an ACK from the slave PLC 10b within the second set time T2, outputs a CMD from the second IF 32 after elapse of the first set time T1 so as to start the reverse-direction system diagnosis. This output CMD is sent to the slave PLC 10d via the signal line 3d. (3) to (7) Operations identical with those in the steps (10) to (14) of the above-described example operation α. (8) After output of an ACK, the slave PLC 10b outputs from the second IF-52 a CMD with its own identification information added thereto. This output CMD is not sent to the master PLC 10a because of breakage of the signal line 3a. Therefore, no ACK is output from the first IF 51 of the master 10a. (9) The slave PLC 10b, which failed to receive the ACK from the master PLC 10a within the second set time T2, determines that a wire-breakage anomaly has occurred, generates a CMD with anomaly information added thereto and representing the wire-breakage anomaly, and outputs it from the first IF 51. This output CMD is sent to the slave PLC 10c via the signal line 2b. (10), (11) Output of a CMD with anomaly information added thereto is successively performed by the slave PLCs 10c and 10d as in step (16) of the above-described example operation β. With this operation, the CMD which was output from the slave PLC 10b and to which anomaly information was added reaches the master PLC 10a. (12) Since the above-described conditions J1 to J5 are satisfied through the above-described operation, the master PLC 10a determines that a wire-breakage anomaly has occurred on the signal lines 2a and 3a, and prohibits the ordinary operation. (13) The panel computer 70 reports the location of the wire-breakage anomaly by means of monitor display as shown in FIG. 10.

δ. At the Time of Reverse Connection

An example sequence operation at the time when the signal lines are reversely connected to the slave PLC 10c will be described with reference to FIGS. 6A and 6B. Notably, numbers each encircled by a circle in FIGS. 6A and 6B correspond to parenthesized numbers which represent respective operation steps in the following description.

(1) to (3) Operations identical with those in the steps (1) to (3) of the above-described example operation α. (4) The slave PLC 10c having received the output CMD from the slave PLC 10b outputs an ACK from the second IF 52. This output ACK is sent to the slave PLC 10d via the signal line 2c, because of reverse connection to the slave PLC 10c, so that the output ACK is not sent to the slave PLC 10b. (5) After output of the ACK, the slave PLC 10c outputs from the first IF 51 a CMD with its own identification information added thereto. This output CMD is sent to the slave PLC 10b via the signal line 3b because of the reverse-connection anomaly. (6) The slave PLC 10b having received a CMD instead of an ACK after output of a CMD outputs an ACK from the first IF 51. This output ACK is sent to the slave PLC 10c via the signal line 2b, because of the reverse-connection anomaly. (7) After output of an ACK, the slave PLC 10b determines that a reverse-connection anomaly has occurred, generates a CMD with anomaly information added thereto and representing the reverse-connection anomaly, and outputs it from the second IF 52. This output CMD is sent to the master PLC 10a via the signal line 3a. Therefore, the master PLC 10a can grasp at this point in time that a reverse-connection anomaly has occurred.

(8) to (10) Operations identical with those in the steps (10) to (12) of the. above-described example operation β. (11) The slave PLC 10c having received the output CMD from the slave PLC 10d outputs an ACK from the first IF 51. This output ACK is sent to the slave PLC 10b via the signal line 3b, because of reverse connection to the slave PLC 10c, so that the output ACK is not sent to the slave PLC 10d. (12) After output of the ACK, the slave PLC 10c outputs from the second IF 52 a CMD with its own identification information added thereto. This output CMD is sent to the slave PLC 10d via the signal line 2c because of the reverse-connection anomaly. (13) The slave PLC 10d having received a CMD instead of an ACK after output of a CMD outputs an ACK from the second IF 52. This output ACK is sent to the slave PLC 10c via the signal line 3c, because of the reverse-connection anomaly. (14) After output of an ACK, the slave PLC 10d determines that a reverse-connection anomaly has occurred, generates a CMD with anomaly information added thereto and representing the reverse-connection anomaly, and outputs it from the first IF 51. This output CMD is sent to the master PLC 10a via the signal line 2d. (15) Since the above-described conditions K3 to K5, K7, K9, and K10 are satisfied through the above-described operation, the master PLC 10a determines that an anomaly of reverse connection to the slave PLC 10c has occurred, and prohibits the ordinary operation. (16) The panel computer 70 reports the location of the reverse-connection anomaly by means of monitor display as shown in FIG. 11.

According to the above-described embodiment, in a normal state, a CMD output from the master PLC 10a as a trigger for the regular-direction system diagnosis returns to the master PLC 10a via the active transmission line 2. Moreover, in a normal state, a CMD output from the master PLC 10a as a trigger for the reverse-direction system diagnosis returns to the master PLC 10a via the backup transmission line 3. Therefore, the master PLC 10a can determine whether or not an anomaly has occurred by monitoring the return of the CMD. In addition, through the monitoring, the master PLC 10a can accurately specify a transmission line on which an anomaly has occurred.

According to the above-described embodiment, between the PLCs 10a to 10d in a normal state, a CMD with direction information added thereto and representing the regular direction is transmitted via the active transmission line 2, and an ACK for the CMD is returned via the backup transmission line 3. Moreover, between the PLCs 10a to 10d in a normal state, a CMD with direction information added thereto and representing the reverse direction is transmitted via the backup transmission line 3, and an ACK for the CMD is returned via the active transmission line 2. Therefore, through the monitoring of the receipt of an ACK and a CMD after output of a CMD, each of the PLCs 10a to 10d can determine whether or not a wire-breakage anomaly has occurred on the signal lines to the adjacent PLC or an anomaly of reverse connection to the adjacent PLC has occurred. In addition, through the monitoring of the receipt of an ACK and a CMD, the master PLC 10*a* can determine whether or not an anomaly of reverse connection to the master PLC 10*a* itself has occurred.

According to the above-described embodiment, when a slave-related anomaly such as wire breakage between the slave PLCs 10*b* to 10*d* or reverse connection to the slave PLCs 10*b* to 10*d* occurs, anomaly information representing the type of the anomaly is sent to the master PLC 10*a* along with the CMD. Therefore, the master PLC 10*a* can accurately determine a slave-related anomaly, which is difficult to determine through monitoring of the return of a CMD or the receipt of an ACK and a CMD. In addition, identification information of a slave PLC(S) which was able to receive and send a CMD in the diagnosis direction is added to a CMD which is sent to the master PLC 10*a* upon occurrence of the slave-related anomaly, together with the anomaly information. Accordingly, the master PLC 10*a* can accurately determine a location where a slave-related anomaly has occurred, which location is difficult to determine through monitoring of the return of a CMD or the receipt of an ACK and a CMD.

In addition, according to the present embodiment, in order to report an anomaly to the operator, the type and location of an anomaly in the distributed control system 1 are graphically displayed on the color monitor 74 of the panel computer 70. Therefore, the operator can immediately know the type and location of the anomaly.

As described above, the present embodiment can automatically specify and report the type and location of an anomaly in the distributed control system 1 without requiring operator's check work. This enables the operator to take proper measures against the anomaly within a short period of time, whereby the time required to recover the distributed control system 1 can be shortened.

In the present embodiment, the communication modules 30 and 50 correspond to "diagnosis command sending means," "acknowledgment-response returning means," "wire-breakage-anomaly determination means," "reverse-connection-anomaly determination means," "regular direction diagnosis command sending means," and "reverse direction diagnosis command sending means" described in the claims. In the present embodiment, the communication module 50 corresponds to "wire-breakage anomaly information sending means," "reverse-connection anomaly information sending means," "anomaly determination means," and "anomaly-information-added-command sending means" described in the claims. In the present embodiment, the second set time T2 corresponds to the "set time" described in the claims. In the present embodiment, at the time of the regular-direction system diagnosis, the active transmission line 2 corresponds to "diagnosis-command transmission line" described in the claims, and the backup transmission line 3 corresponds to "acknowledgment-response transmission line" described in the claims; and at the time of the reverse-direction system diagnosis, the backup transmission line 3 corresponds to "diagnosis-command transmission line" described in the claims, and the active transmission line 2 corresponds to "acknowledgment-response transmission line" described in the claims. In the present embodiment, the panel computer 70 including the built-in color monitor 74 corresponds to a "reporting device" and "display means" described in the claims.

One embodiment of the present invention has been described above; however, the present invention should not be interpreted to be limited to the embodiment. For example, any number of slave PLCs can be used depending on the specifications, state of use, etc. of the distributed control system. Further, the topology of the active and backup transmission lines of the distributed control system is not limited to the ring type described in the above-described embodiment, and may be of a bus type or a star type.

Further, the above-described embodiment may be modified such that an operator can view anomaly information, diagnostic results, etc. which can obtain through system diagnosis via an apparatus connected to a slave PLC. In this case, the function of the panel computer 70 of the embodiment can be realized by the apparatus. Further, the manner of displaying the type and location of an anomaly by the panel computer 70 is not limited to the manner described in the embodiment. For example, of the station numbers of all the PLCs displayed on the color monitor 74, the station numbers of PLCs sandwiching a broken wire, or the station number of a PLC to which signal lines are reversely connected may be displayed in a color different from that for the normal state, or the color of an area(s) surrounding the station number(s) may be changed. Moreover, in place of the panel computer 70, various apparatuses having an information display function and functions according to the present invention may be employed as a reporting device which reports an anomaly by display. Further, in place of the device which reports an anomaly by display, a device which reports an anomaly by sound or by combination of sound and display may be employed as a reporting device. Notably, when the report is performed by sound, the reporting sound may be changed in accordance with the type and/or location of an anomaly.

The aforementioned embodiment achieves following advantages.

When a certain PLC having sent a diagnosis command cannot receive an acknowledgment response from a PLC located upstream on the acknowledgment-response transmission line, the certain PLC can determine that an anomaly has occurred between the certain PLC and the downstream-side PLC. Since the location of an anomaly in the system can be specified without requiring operator's check work, the time required to recover the system can be shortened.

When a signal line which forms at least one of the diagnosis-command transmission line and the acknowledgment-response transmission line (hereinafter this signal line will be referred to as "transmission-line forming signal line") is broken between an upstream-side PLC and a PLC located downstream on the diagnosis-command transmission line, the upstream-side PLC cannot receive an acknowledgment response after transmission of the diagnosis command until measures against the wire-breakage anomaly are taken. Further, when a transmission-line forming signal line for connecting a certain PLC to a PLC located upstream on the diagnosis-command transmission line and a transmission-line forming signal line for connecting the certain PLC to a PLC located downstream on the acknowledgment-response transmission line are reversely connected to the certain PLC, the downstream-side PLC receives a diagnosis command rather than an acknowledgment response after transmission of a diagnosis command.

Each PLC can determine the type of the anomaly from the results of determination by the wire-breakage-anomaly determination means and the results of determination by the reverse-connection-anomaly determination mean. Since proper measures corresponding to the type of the anomaly can be taken within a short time, the time required to restore or recover the system can be further shortened.

The PLCs may include one master PLC and at least one slave PLC. In this case, the master PLC can determine that the transmission-line forming signal lines are broken when the master PLC does not receive an acknowledgment response from a PLC located upstream on the acknowledgment-response transmission line within a predetermined time, and can determine that the transmission-line forming signal lines are reversely connected when the master PLC receives a diagnosis command before receipt of an acknowledgment response. Therefore, the master PLC can properly determine whether the anomaly is a wire-breakage anomaly or a reverse-connection anomaly.

The master PLC can determine that the transmission-line forming lines are broken when it receives the wire-breakage anomaly information indicative, and can determine that the transmission-line forming lines are reversely connected when it receives the reverse-connection anomaly information. Therefore, the master PLC can correctly perform determination of these anomalies. Further, in the case where another slave PLC is present between the master PLC and the slave PLC having sent the reverse-connection anomaly information, the PLC can perform determination as in the case of the master PLC.

Occurrence of an anomaly can be determined on the basis of the results of determination as to whether a diagnosis command sent from the master PLC, which is the start point of the diagnosis-command transmission line, reaches the slave PLC or the master PLC, which is the end point of the diagnosis-command transmission line. In addition, the location of an anomaly between the PLCs can be specified on the basis of the presence or absence of a returned acknowledgment response to the diagnosis command.

The identification information of a slave PLC having received and sent the diagnosis command is cumulatively added to the diagnosis command, but the identification information of a slave PLC not having received and sent the diagnosis command is not added to the diagnosis command. Accordingly, the normal portions of the system can be correctly specified through analysis of the diagnosis command.

Since the identification information of the slave PLC having received and sent the diagnosis command has been cumulatively added to the diagnosis command received by the slave PLC, the anomaly-information-added command includes the identification information and the anomaly information. The master PLC having received the anomaly-information-added command can correctly specify the normal portions and anomalous portions of the system from the identification information and the anomaly information. Further, in the case where another slave PLC is present between the master PLC and the slave PLC having sent the anomaly-information-added command, the PLC can correctly specify the normal portions and anomalous portions as in the case of the master PLC.

When system diagnosis is performed while switching the transmission line for the diagnosis command and the transmission line for the acknowledgment-response, it becomes possible to determine whether the anomaly has occurred on the active transmission line or the backup transmission line. Accordingly, the accuracy in specifying the location of an anomaly is improved.

When the regular direction diagnosis command sending means of the master PLC sends a diagnosis command, unless an anomaly has occurred on the active transmission line, the diagnosis command reaches the master PLC via the slave PLC. Meanwhile, when the reverse direction diagnosis command sending means of the master PLC sends a diagnosis command, unless an anomaly has occurred on the backup transmission line, the diagnosis command reaches the master PLC via the slave PLC. Therefore, on the basis of the results of determination as to whether the master PLC receives a diagnosis command after the regular direction diagnosis command sending means or the reverse direction diagnosis command sending means sends the diagnosis command, the master PLC can determine whether or not an anomaly has occurred and can specify the transmission line on which the anomaly has occurred. Accordingly, since the location of an anomaly in the system can be specified without requiring operator's check work, the time required to recover the system can be shortened.

The operator can know, without failure, the occurrence of an anomaly in the system by means of a report by the reporting device.

Since the operator can visually recognize the anomalous portion of the system instantaneously by the display of the display means, the time needed before measures against the anomaly are taken can be shortened.

The operator can recognize, without failure, the occurrence of the wire-breakage anomaly and the reverse-connection anomaly in the system by means of a report from the reporting device.

The display of the display means enables the operator not only to visually recognize the anomalous portion of the system instantaneously and but also to instantaneously grasp whether the anomaly is the wire-breakage anomaly or the reverse-connection anomaly. Therefore, the time needed before measures against the anomaly are taken can be shortened.

Obviously, numerous modifications and variations of the present invention are possible in light of the above teachings, It is therefore to be understood that within the scope of the appended claims, the present invention may be practiced otherwise than as specifically described herein.

What is claimed is:

1. A distributed control system in which a plurality of PLCs is connected together via active and backup transmission lines which are opposite in transmission direction, wherein each of the PLCs comprises:
   diagnosis command sending means for sending a diagnosis command, via a diagnosis-command transmission line, which is one of the active transmission line and the backup transmission line, to a PLC located downstream on the diagnosis-command transmission line; and
   acknowledgment-response returning means, operable upon receipt of the diagnosis command, for returning an acknowledgement response for the diagnosis command, via an acknowledgment-response transmission line, which is the other of the active transmission line and the backup transmission line, to a PLC located downstream on the acknowledgment-response transmission line.

2. The distributed control system according to claim 1, wherein each of the PLCs comprises:
   wire-breakage-anomaly determination means for determining that a signal line which forms at least one of the diagnosis-command transmission line and the acknowledgment-response transmission line is broken when the acknowledgment response is not received from a PLC located upstream on the acknowledgment-response transmission line within a predetermined time after the diagnosis command sending means sends the diagnosis command; and
   reverse-connection-anomaly determination mean for determining that a signal line which forms at least one of the diagnosis-command transmission line and the acknowledgment-response transmission line is reversely connected when the diagnosis command is received, in place of the acknowledgment response, from the PLC located upstream on the acknowledgment-response transmission line within the predetermined time after the diagnosis command sending means sends the diagnosis command.

3. The distributed control system according to claim 2, wherein the PLCs include one master PLC and at least one slave PLC, and wherein the slave PLC comprises:
   wire-breakage anomaly information sending means for transmitting anomaly information indicative of a wire-breakage anomaly to the master PLC via the acknowledgment-response transmission line when the wire-breakage-anomaly determination means determines that a wire-breakage anomaly has occurred; and
   reverse-connection anomaly information sending means for transmitting anomaly information indicative of a reverse-connection anomaly to the master PLC via the acknowledgment-response transmission line when the reverse-connection-anomaly determination means determines that a reverse-connection anomaly has occurred.

4. The distributed control system according to claim 1, wherein the PLCs include one master PLC and at least one slave PLC, and wherein the diagnosis command sending means of the master PLC sends the diagnosis command to a slave PLC located downstream on the diagnosis-command transmission line as a trigger for a system diagnosis; and upon receipt of the diagnosis command, the diagnosis command sending means of the slave PLC sends the diagnosis command to the master PLC or a slave PLC located downstream on the diagnosis-command transmission line.

5. The distributed control system according to claim 4, wherein the system comprises a plurality of slave PLCs, and wherein every time the diagnosis command is sent from the diagnosis command sending means of each slave PLC, identification information for identifying the slave PLC is cumulatively added to the diagnosis command.

6. The distributed control system according to claim 5, wherein each of the slave PLCs comprises:
   anomaly determination means for determining that a system anomaly has occurred when the acknowledgment response is not received from the master PLC or a slave PLC located downstream on the diagnosis-command transmission line within a set time after the diagnosis command sending means sends the diagnosis command; and
   anomaly-information-added-command sending means, operable when the anomaly determination means determines that a system anomaly has occurred, for generating an anomaly-information-added command by adding anomaly information to the diagnosis command received from the slave PLC or the master PLC, and transmitting the anomaly-information-added command to the master PLC via the acknowledgment-response transmission line.

7. The distributed control system according to claim 1, which performs a regular-direction system diagnosis in which the active transmission line is selected as the diagnosis-command transmission line and the backup transmission line is selected as the acknowledgment-response transmission line, and a reverse-direction system diagnosis in which the backup transmission line is selected as the diagnosis-command transmission line and the active transmission line is selected as the acknowledgment-response transmission line.

8. The distributed control system according to claim 1 wherein the topology of the active transmission line and the backup transmission line is of a ring type.

9. A distributed control system in which a plurality of PLCs is connected together via active and backup transmission lines which are opposite in transmission direction and which have a ring-type topology, wherein each of the PLCs comprises:
   regular direction diagnosis command sending means for sending a diagnosis command to a PLC located downstream on the active transmission line via the active transmission line whose transmission direction is the regular direction; and
   reverse direction diagnosis command sending means for sending a diagnosis command to a PLC located downstream on the backup transmission line via the backup transmission line whose transmission direction is opposite to the regular direction,
   wherein the PLCs includes a master PLC which administers system diagnosis and at least one slave PLC;
   the regular direction diagnosis command sending means and the reverse direction diagnosis command sending means of the master PLC send the diagnosis command to the slave PLC as a trigger for system diagnosis; and
   upon receipt of the diagnosis command, the regular direction diagnosis command sending means and the reverse direction diagnosis command sending means of the slave PLC send the diagnosis command to another slave PLC or the master PLC.

10. The distributed control system according to claim 1, further comprising a reporting device for reporting an anomaly when the anomaly has occurred in the distributed control system.

11. The distributed control system according to claim 10, wherein the reporting device includes display means for graphically displaying an anomalous portion of the distributed control system.

12. The distributed control system according to claim 10, wherein the reporting device reports a wire-breakage anomaly of a signal line which forms at least one of the diagnosis-command transmission line and the acknowledgment-response transmission line, and a reverse-connection anomaly of a signal line which forms at least one of the diagnosis-command transmission line and the acknowledgment-response transmission line.

13. The distributed control system according to claim 12, wherein the reporting device includes display means for graphically displaying an anomalous portion of the distributed control system such that the wire-breakage anomaly and the reverse-connection anomaly are displayed in different manners.

14. The distributed control system according to claim 9, further comprising a reporting device connected to the master PLC for reporting an anomaly occurred in the distributed control system.

15. The distributed control system according to claim 14, wherein the reporting device includes display means for graphically displaying an anomalous portion in the distributed control system.

16. The distributed control system according to claim 14, wherein the reporting device includes display means for graphically displaying an anomalous portion of the distributed control system such that the wire-breakage anomaly and the reverse-connection anomaly are displayed in different manners.

17. The distributed control system according to claim 9, further comprising acknowledgment-response returning means, operable upon receipt of the diagnosis command, for returning an acknowledgement response for the diagnosis command, via an acknowledgment-response transmission line, which is the other of the active transmission line and the backup transmission line, to a PLC located downstream on the acknowledgment-response transmission line.

18. The distributed control system according to claim 9, wherein only the master PLC is connected to a computer having a monitor.

* * * * *